(12) United States Patent
Dinescu (10) Patent No.: US 8,194,543 B2
(45) Date of Patent: Jun. 5, 2012

(54) METHODS OF DATA TRAFFIC SHAPING, APPARATUS AND WIRELESS DEVICE

(75) Inventor: Dan Dinescu, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 12/337,652

(22) Filed: Dec. 18, 2008

(65) Prior Publication Data

US 2010/0157797 A1 Jun. 24, 2010

(51) Int. Cl.
*H04L 12/26* (2006.01)
(52) U.S. Cl. ...................... 370/230.1; 370/412
(58) Field of Classification Search .......... 370/229–237, 370/395.1–395.72, 252, 412, 413, 419, 226, 370/243, 246
See application file for complete search history.

(56) References Cited

U.S. PATENT DOCUMENTS

| | | | |
|---|---|---|---|
| 6,490,251 B2 * | 12/2002 | Yin et al. | 370/236.1 |
| 6,643,256 B1 * | 11/2003 | Shimojo et al. | 370/229 |
| 6,894,974 B1 * | 5/2005 | Aweva et al. | 370/230.1 |
| 2004/0078482 A1 * | 4/2004 | Blumrich et al. | 709/238 |
| 2004/0085915 A1 * | 5/2004 | Gronau et al. | 370/282 |
| 2006/0045008 A1 * | 3/2006 | Sun et al. | 370/229 |
| 2007/0002863 A1 | 1/2007 | Black | |
| 2007/0086335 A1 * | 4/2007 | McCanne et al. | 370/229 |
| 2008/0019274 A1 * | 1/2008 | Droux et al. | 370/235 |
| 2009/0073878 A1 * | 3/2009 | Carlberg | 370/230 |
| 2009/0147685 A1 * | 6/2009 | Malhotra | 370/236 |
| 2009/0252036 A1 * | 10/2009 | Fong et al. | 370/231 |

FOREIGN PATENT DOCUMENTS

| | | |
|---|---|---|
| JP | 2001127830 A | 5/2001 |
| JP | 2004180158 A | 6/2004 |
| JP | 2005094249 A | 4/2005 |
| JP | 2006245887 A | 9/2006 |
| JP | 2006279867 A | 10/2006 |
| JP | 2007266949 A | 10/2007 |
| WO | 2008040725 A1 | 4/2008 |
| WO | 2008112456 A1 | 9/2008 |
| WO | 2008148173 A1 | 12/2008 |

OTHER PUBLICATIONS

Rohde & Schwarz: R&S AMU200A Baseband Signal Generator and Fading Simulator, Specifications, Version 01.00, Apr. 2007, Firmenschrift.
English abstract of JP 2006279867 A.
English abstract of JP 2001127830 A.
English abstract of JP 2006245887 A.
English abstract of JP 2005094249 A.
English abstract of JP 2004180158 A.
English abstract of JP 2007266949 A.

* cited by examiner

*Primary Examiner* — Gary Mui (57) ABSTRACT

Methods of data traffic shaping, an apparatus and a wireless device are provided. A method of data traffic shaping comprises receiving data packets, the data packets to be forwarded; storing at least one of the data packets in a buffer memory if the buffer memory has an available space for accommodating the at least one of the data packets; and discarding at least one other of the data packets if the buffer memory does not have an available space for accommodating the at least one other of the data packets. An apparatus is configured to carry out the method. A wireless device may include the apparatus.

23 Claims, 4 Drawing Sheets

FIG 2

210
Receiving payload data packets, the payload data packets to be forwarded in a first direction of a bidirectional data connection

220
Storing the received payload data packets in a buffer memory if the buffer memory has an assigned free space available for the respective next received payload data packet

230
Discarding the received payload data packets if the buffer memory does not have an assigned free space available for the respective next received payload data packet

Receiving a data stream to be transmitted in one direction of a bidirectional data connection, the data stream comprising payload data packets and comprising acknowledgements, the acknowledgements acknowledging receipt of data transmitted in another direction of the bidirectional data connection

320

Simulating a loss of a payload data packet received in the data stream, the loss occuring allegedly further downstream in the one direction of the bidirectional data connection

FIG 4

METHODS OF DATA TRAFFIC SHAPING, APPARATUS AND WIRELESS DEVICE

TECHNICAL FIELD

Embodiments of the invention relate generally to methods of data traffic shaping, to an apparatus and to a wireless device.

DETAILED DESCRIPTION OF THE INVENTION

The following detailed description explains exemplary embodiments of the present invention. Where applicable the description of a method embodiment is deemed to describe also the functioning of a corresponding apparatus embodiment and vice versa. The description is not to be taken in a limiting sense, but is made only for the purpose of illustrating the general principles of the invention. The scope of the invention, however, is only defined by the claims and is not intended to be limited by the exemplary embodiments described below.

Figure 1:
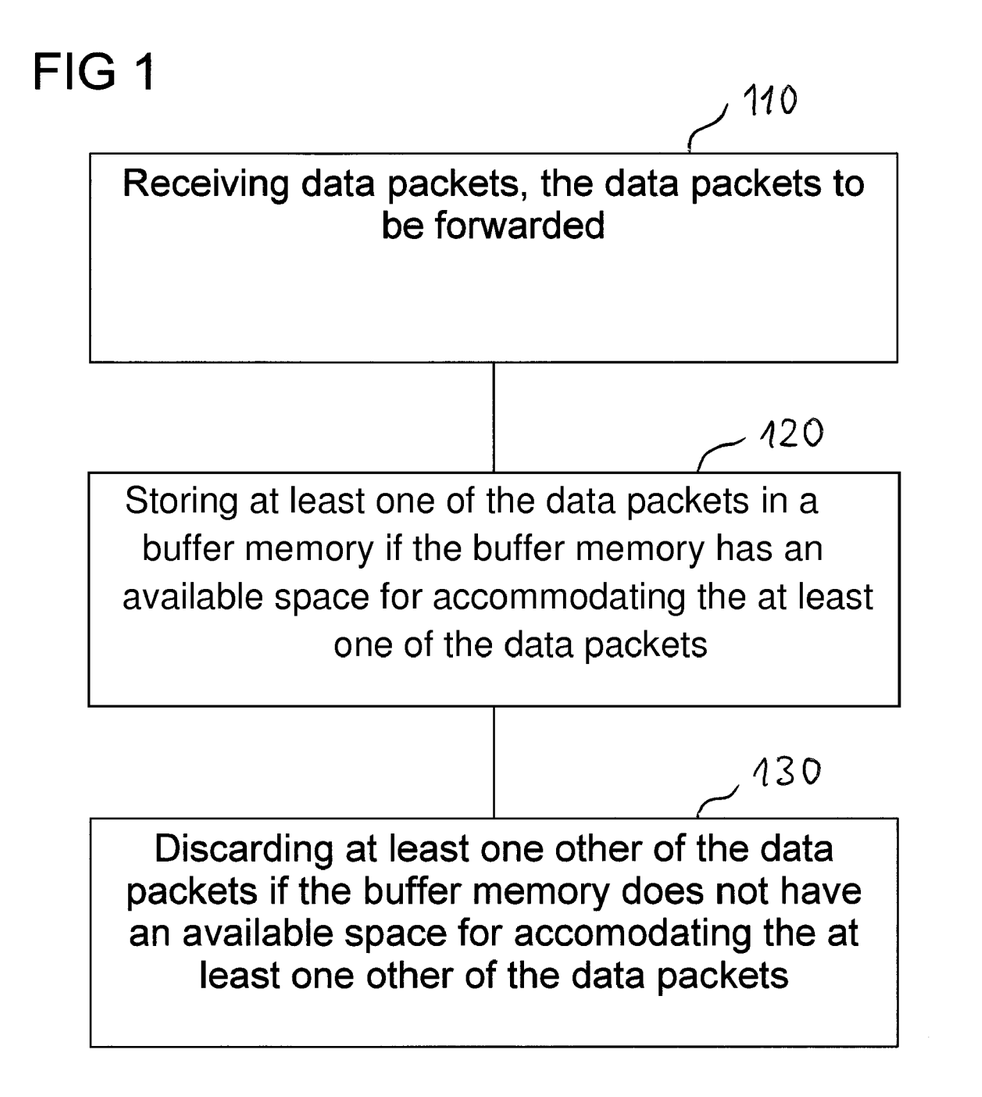
FIG. 1 shows a method of data traffic shaping in accordance with an embodiment of the invention.

In FIG. 1 a method of data traffic shaping in accordance with an embodiment of the invention is shown.

Data traffic shaping usually means that the data flow over a data connection (the "traffic") is purposely affected. Thus a behaviour of the data connection or the data flow itself may be improved.

At 110, data packets are received. The data packets are to be forwarded.

At 120, at least one of the data packets is stored in a buffer memory if the buffer memory has an available space for accommodating the at least one of the data packets.

At 130, at least one other of the data packets is discarded if the buffer memory does not have an available space for accommodating the at least one other of the data packets.

Figure 2:
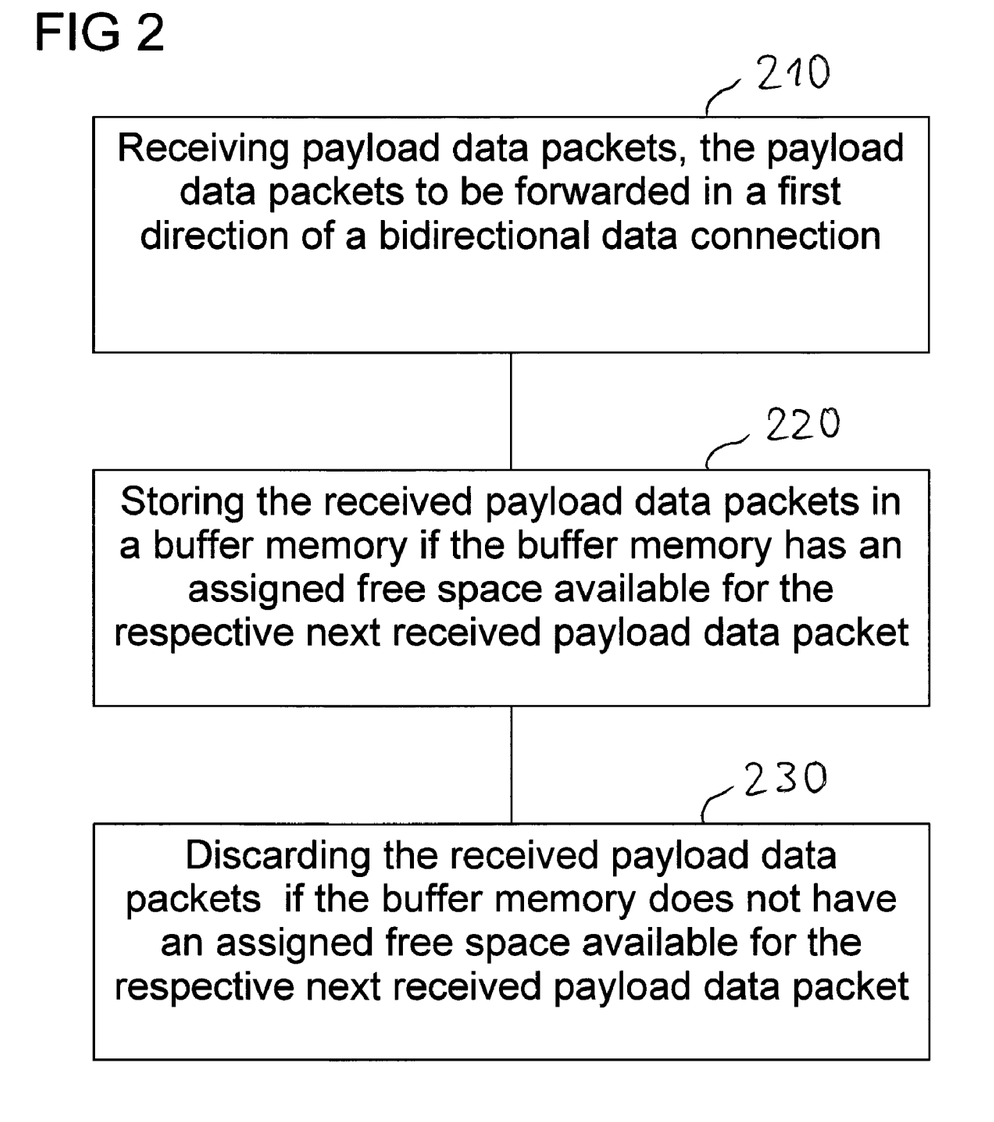
FIG. 2 shows a method of data traffic shaping in accordance with another embodiment of the invention.

In FIG. 2 a method of data traffic shaping in accordance with another embodiment of the invention is shown.

At 210, payload data packets are received. The payload data packets to be forwarded in a first direction of a bidirectional data connection.

At 220, the received payload data packets are stored in a buffer memory if the buffer memory has an assigned free space available for the respective next received payload data packet.

At 230, the received payload data packets are discarded if the buffer memory does not have an assigned free space available for the respective next received payload data packet.

Figure 3:
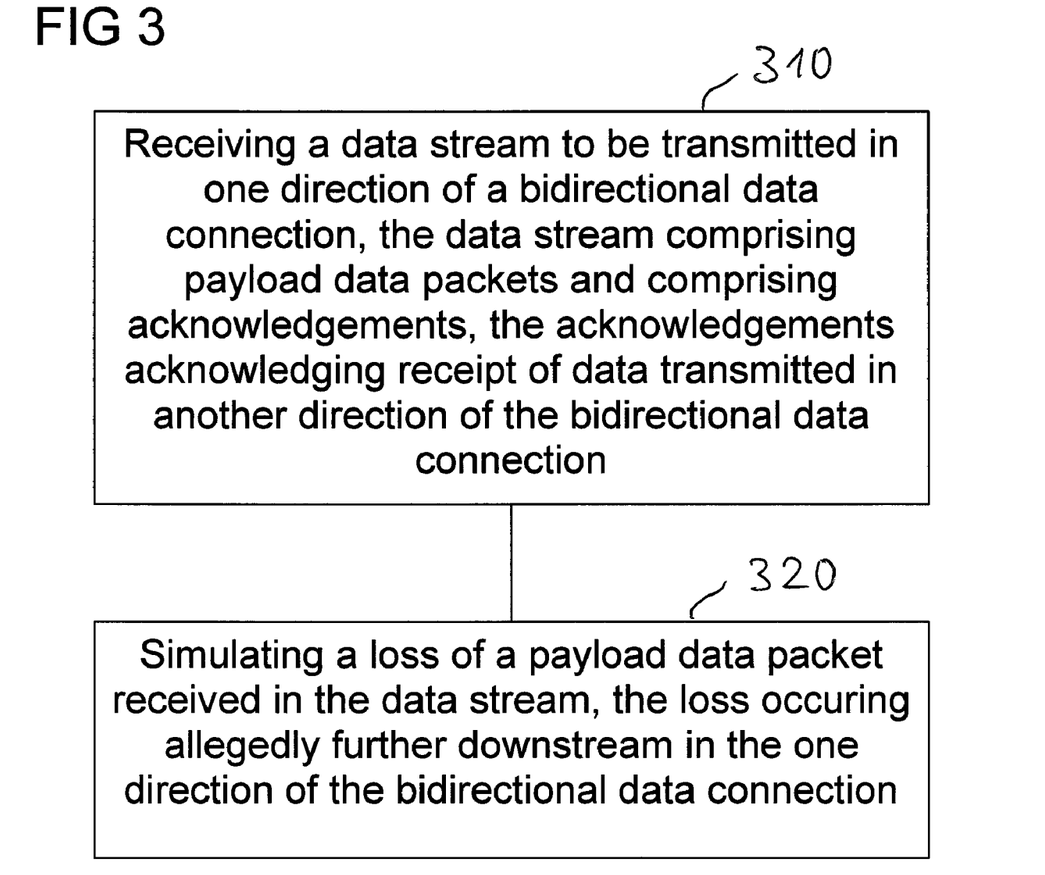
FIG. 3 shows a method of data traffic shaping in accordance with yet another embodiment of the invention.

In FIG. 3 a method of data traffic shaping in accordance with yet another embodiment of the invention is shown.

At 310, a data stream is received. The data stream is to be transmitted in one direction of a bidirectional data connection. The data stream includes payload data packets and includes acknowledgements. The acknowledgements are acknowledging receipt of data transmitted in another direction of the bidirectional data connection.

At 320, a loss of a payload data packet received in the data stream is simulated. The simulated loss occurs allegedly further downstream in the one direction of the bidirectional data connection.

A data connection used to transmit data may be used to transmit data in opposite directions simultaneously. The data may be transmitted over separate transmission channels in each direction or may be transmitted using a single transmission channel in a time-multiplexed fashion. In any such case it is generally desirable that a data transfer in one direction does not disturb a simultaneous data transfer in the other direction.

A bidirectional data connection can have a high speed direction and a low speed direction. One can also say that it may have a high speed path and a low speed path. Such a data connection is called an asymmetrical data connection. For example, ADSL (Asymmetrical Digital Subscriber Line), which is a wireline data connection, and HSDPA (High Speed Downlink Packet Access), which is a wireless data connection, are strongly asymmetrical data connections. An asymmetrical data connection usually provides a high transmission speed in downlink (which is usually the direction from a network or a server to a terminal or a user) and usually provides a low transmission speed in uplink (which is usually the direction from a terminal or a user to a network or a server).

On an asymmetrical data connection a data transfer in the high speed direction (e.g. downlink) may be severely affected by any data transfers in the low speed direction (e.g. uplink). This is especially the case when the data connection is operated according to the Transmission Control Protocol TCP.

A data transmission in the low speed direction may easily overload the available transmission capacity. On a strongly asymmetrical data connection the transmission capacity of the low speed direction is much lower than that of the high speed direction. To say it in other words, a saturation of the transmission bandwidth in the low speed direction may occur.

At the same time data are transmitted in the high speed direction of the data connection at a high data rate which is made possible by the high transmission capacity of the high speed direction. Acknowledgements acknowledging receipt of these high speed data are generated upon receiving the data. The acknowledgements are to be transmitted back to the sender of the high speed data using the low speed direction.

As a consequence of a saturation of the transmission bandwidth in the low speed direction, the acknowledgements acknowledging receipt of data being transmitted in the high speed direction of the data connection cannot be properly transmitted. For instance they get stuck in a long waiting queue of all the other data to be transmitted in the low speed direction. The sender of the high speed data does not receive acknowledgements for the high speed data timely enough and slows down or even interrupts the data transfer in the high speed direction.

As can be seen from what was said above a saturation of the transmission bandwidth in the low speed direction may lead to slowing down a high speed data transfer in the other direction, thus leaving a large portion of the transmission bandwidth available in the high speed direction unused.

In order to better utilize the bandwidth (BW) in the high speed direction a method of traffic shaping may be used.

Also at a less asymmetrical bidirectional data connection or even at a strongly symmetrical bidirectional data connection the data transfer in one direction may be adversely affected by the data transfer in the other direction, e.g. acknowledgements acknowledging receipt of data transferred in the one direction and therefore travelling in the other direction may be delayed by payload data travelling also in the other direction.

In order to better utilize the bandwidth in any bidirectional data connection and in any direction of this bidirectional data connection a method of traffic shaping may be used.

In the following the traffic shaping is explained further. An embodiment of the invention is considered where a client data processing device, e.g. a client computer, e.g. a personal computer (PC), is connected with a server data processing device, e.g. a computer, e.g. a server situated in the internet, via an asymmetrical data connection according to the Transmission Control Protocol (TCP). The asymmetrical data connection provides a high transmission speed in downlink (DL), which is from the server to the client, and it provides a low transmission speed in uplink (UL), which is from the client to the server. The data connection or a part of the data connection may for example be realised by a modem, e.g. a wireless modem, which may be a stand-alone modem or may be built in the client computer, e.g. in a notebook PC or in a personal digital assistant (PDA), or may be integrated into a separate mobile phone which is used together with the server computer.

A computer program that runs on the client computer or on a router associated with the data connection may be used as a traffic shaper. The traffic shaper may monitor the applications on the client computer and limit the data they are allowed to send in the UL, thus avoiding to saturate the bandwidth (BW) available in UL. The TCP acknowledgements (ACKs) can then be transmitted in UL immediately. The traffic shaper may filter the ACKs for the DL data packets and give them a higher priority against the other UL data packets. Thus the ACKs don't have to wait in the queues and can be transmitted in UL immediately, even if the BW in UL is saturated.

The approaches described in the preceding paragraph may work well but are not appropriate in all cases. Such a case is when the client computer is connected to the network (the server computer) using a mobile phone or a wireless modem or the like, generally referred to as a wireless device in the following.

Controlling the portion of the BW in UL which is allowed to be used by applications on the client computer would mean the user has to install special software which means additional costs and potentially configuration work. Furthermore, the additional buffers between a traffic shaper implemented on the client computer and an analog interface to communication media connecting to the network would contribute to increasing the ACK delay.

Even if looking for a solution implemented in the wireless device, where the TCP ACKs would receive a higher priority and thus would not have to wait in the queues of the wireless device, the gain is little because these queues are rather small when compared to the buffers in the client computer which may be a Personal Computer (PC) or the like. The data buffers in the wireless device can be quickly filled up only with data an application on the client computer wants to send in UL. So no ACK is present in the data buffer (the queue) of the wireless device to be filtered out and to be put in front of the other data. An attempt to give the TCP ACKs a higher priority with respect to the queues of the wireless device might therefore not work well.

In accordance with embodiments of the invention at least one data packet is discarded instead of being forwarded. This has the effect that this data packet does not reach the addressee and the addressee does not send back an ACK for this data packet to the sender of the data packet. This in turn has the effect that the sender will be informed that a data packet got lost somewhere on its way to the addressee. A sender using a data transmission protocol which controls the outgoing data flow based on received ACKs will react by reducing the data rate, i.e. by sending less data per time from now on, since a loss of a data packet is an indication that the data rate used before was too high, i.e. required more BW than the data connection was able to provide. In other words, discarding a data packet as described here is a way of signaling to the sender, e.g. to the TCP/IP protocol stack of a client computer, that it tries to use a BW which is too high and that the sender should use a lower BW.

The target of this manipulation is to limit the BW used by data, e.g. payload data packets, in one direction of a data connection, e.g. in UL, to a value which gives also the ACKs travelling in the one direction, which are acknowledging receipt of data travelling in the other direction of the data connection, e.g. for the DL data packets, the needed portion of BW. Thus the BW in the one direction, e.g. in UL, will not get continuously saturated by data travelling in the one direction and the data queues across the system in the one direction will not fill up. This will minimize the delays imposed to the ACKs for the data travelling in the other direction of the data connection, e.g. for the DL data packets.

In accordance with embodiments of the invention only one data packet is discarded. Later data packets may be normally forwarded to the addressee. This has still the effect of signaling to the sender that it tries to use a BW which is too high and that the sender should use a lower BW. This has the further effect that the data transmission is less disturbed than in a case where more than one data packet would be discarded. The addressee may send a notification to the sender that one data packet did not arrive and may still send ACKs for later data packets. It should be noted that limiting the BW used by data in the one direction of the data connection does not rely on the pure absence of the only one or on the pure absence of the more than one discarded data packets further downstream but instead is based on the signaling effect and on the reaction of the sender to use a lower BW once it recognises that a data packet got lost somewhere on its way to the addressee.

In accordance with an embodiment of the invention a data packet is manipulated and then forwarded to the addressee (instead of being discarded). For example, a check sum in the data packet is purposely altered. As a result of the manipulation, the manipulated data packet will not be recognised as a properly received data packet at the addressee. The addressee will not send back an ACK for this manipulated data packet to the sender of the data packet. This has again the effect of signaling to the sender that it tries to use a BW which is too high and that the sender should use a lower BW.

A proposed solution according to an embodiment tries to reduce the delay in the system for the ACKs generated for the DL data packets. These ACKs will be transmitted in the UL direction. In order to achieve this, the UL relevant buffers in the PC should be empty most of the time and in the modem the ACKs should be allowed to overtake the data packets and be sent with higher priority. This will make sure that the ACKs do not have to wait for the UL data packets both in the PC buffers and in the modem buffers.

According to an embodiment, the modem will, in order to achieve the two prerequisites mentioned in the preceding paragraph, read all the data the PC can send and do the following for each packet: If the packed is an ACK, then store it in an ACK buffer. If this buffer is full, then flow control between UE and PC will be used. If the packed is a TCP data packet, then store it in another buffer memory which may be called a "congestion buffer". If this buffer memory is full or has reached a predetermined filling level, then discard at least one of the remaining data packets. More than one or even all of the remaining data packets may be discarded. Discarding means that the respective data packets are fully abandoned and will not be forwarded. Other data packets (like UDP) should be stored also in the congestion buffer or in another buffer. If no place for storing is available, then the flow control mechanism between modem and PC may be used.

According to an embodiment, only one of the remaining data packets is discarded if the buffer memory ("congestion buffer") reaches a predetermined filling level, e.g. a given filling level threshold. The other remaining data packets are stored in the buffer memory. Discarding just one data packet is sufficient to give the signaling effect and to provoke the reaction of the sender to use a lower BW once it recognises that a data packet got lost somewhere on its way to the addressee. If no place for storing more data packets of the other remaining data packets is available in the buffer memory, then the flow control mechanism between modem and PC may be used. Alternatively, to store these data packets another memory may be used as an extension of the buffer memory.

In an embodiment, only one of the remaining data packets is discarded if the buffer memory ("congestion buffer") reaches a predetermined filling level, e.g. a given filling level threshold, and no more data packet is discarded unless the filling level of the buffer memory falls below the predetermined filling level, e.g. the given filling level threshold, and approaches and reaches the predetermined filling level again from below that level. For example, the sender first decreases the number of data packets "on the fly" as a reaction to the loss of the discarded data packet and this leads to a significant decrease of the filling level of the buffer memory. After that, the sender slowly tries to increase the number of data packets "on the fly" again. After some time the filling level will again reach the predetermined filling level, e.g. the given filling level threshold. Then again just only one of the remaining data packets is discarded.

Discarding data packets will impact the general data rate in UL little. The TCP/IP stack in the PC will hold the dropped data packets for network congestion and will try to re-send them. The TCP/IP stack in the PC will also accordingly adapt the so called congestion window, i.e. give it a considerably smaller size. Therefore it will not send more data on the fly (without acknowledge) then the congestion buffer can hold. As an immediate result, the modem can empty the PC buffer into the internal buffers, e.g. ACK buffer and congestion buffer, without having to drop any more data packets.

As the congestion window increases only slowly again after each dropped packet, there will be a period when no packets are discarded. An empty PC buffer will allow the ACKs to reach the modem without delays.

In an embodiment, the ACKs are given in the modem a higher priority compared to the data packets. Therefore they will not be delayed here either.

The result of this approach will be a slight drop in the UL data rate at the beginning and a rather good average data rate afterwards. The DL data rate will not be affected anymore by the UL connection.

Embodiments of the invention have the following advantages: Methods of data shaping according to embodiments can be fully and transparently implemented in the modem, where the term "transparently implemented" means, that the client computer, the server computer and the rest of the data connection will not depend on the implementation. The client computer and the server computer and the rest of the data connection (data path) need not to be changed. The data flow adjusts itself without any active tuning being necessary. The behaviour of the data flow is largely independent of the settings of the computer receiving the data in UL. Optimal data rates in both directions (UL, DL) can be achieved simultaneously.

In accordance with embodiments of the invention the traffic shaping is based on a simulation in the modem of a network congestion. According to embodiments the simulation of a network congestion includes dropping UL data packets when the internal (congestion) buffer is full. Given the flow control and congestion avoidance mechanisms defined in a data transmission protocol using acknowledgements to ensure proper receipt of data, e.g. TCP, this approach helps regulating the communication. Thus the portion of the BW in UL used by the UL data packets is limited and a continuous saturation of the BW in UL by data, which would delay ACKs travelling in parallel to the data, may be avoided. Giving a higher priority to the ACKs in the UL direction in the modem further improves regulating the communication.

Figure 4:
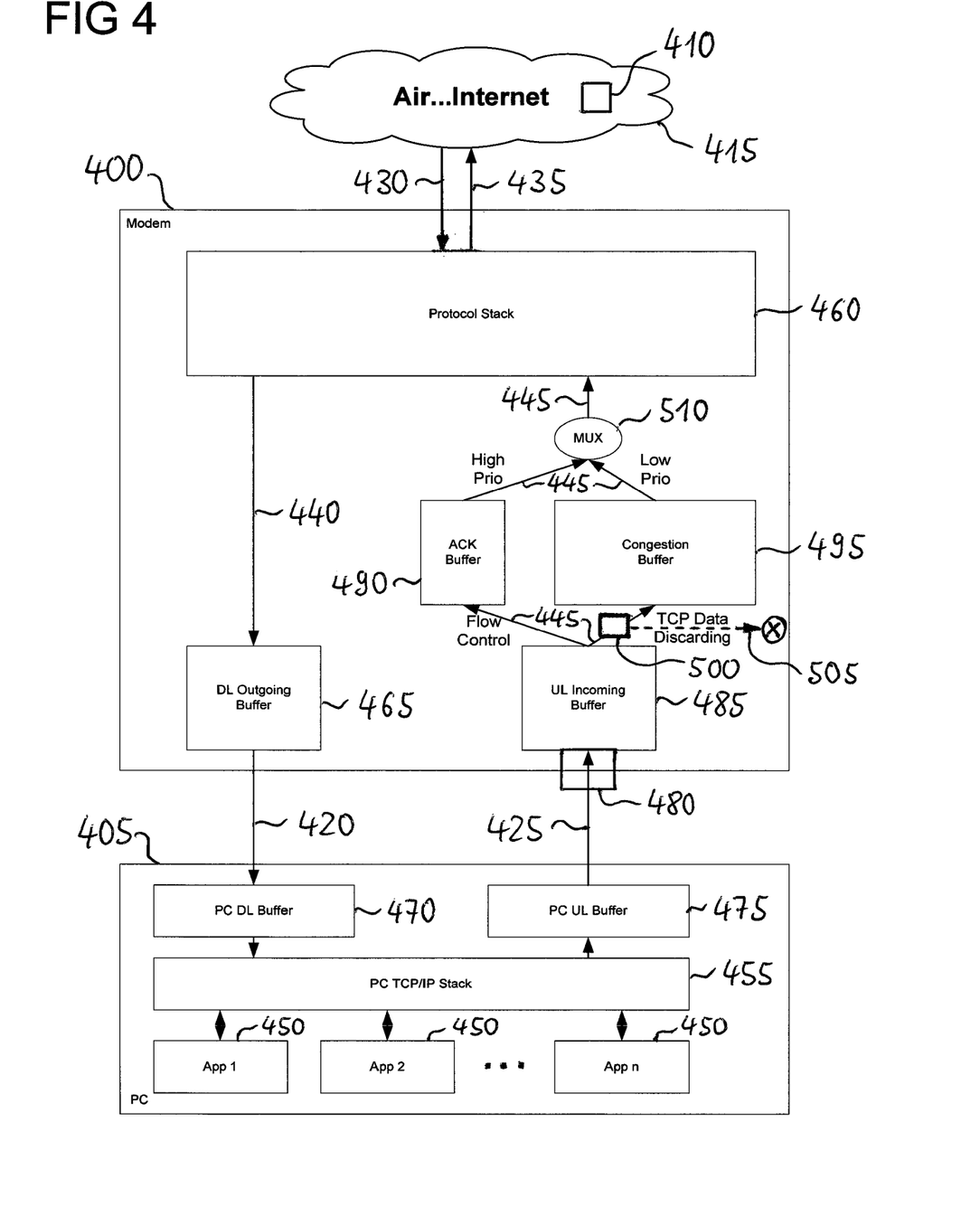
FIG. 4 shows a block diagram of an apparatus in accordance with an embodiment of the invention.

In FIG. 4 a block diagram of an apparatus in accordance with an embodiment of the invention is shown. The apparatus is included in a wireless device 400, which for example is a dedicated wireless modem for data transfer or a wireless modem integrated in a mobile phone or PDA (personal digital assistant).

A client computer (user computer) 405, which for example is a Personal Computer (PC), is connected with a server computer 410, e.g. a server in the internet 415, via an asymmetrical data connection 420, 425, 430, 435 according to the Transmission Control Protocol (TCP). The asymmetrical data connection includes a local connection 420, 425 e.g. a USB (Universal Serial Bus) connection, between the client/user 405 and the wireless device 400, and includes a connection over the air 430, 435 between the wireless device 400 and the server 410. It has a downlink (DL) direction 420, 430, which is the direction from the server 410 to the client 405, and it has an uplink (UL) direction 425, 435, which is the direction from the client 405 to the server 410. The DL path in the wireless device 400 is shown as data lines 440 and the UL path in the wireless device 400 is shown as data lines 445. The asymmetrical data connection provides a high transmission speed in the connection over the air 430 in DL, and it provides a low transmission speed in the connection over the air 435 in UL.

Several application programs 450 (shown as being numbered 1, 2, . . . , n) which are executed by the PC may simultaneously exchange data with one or more servers 410 in the internet 415 via the wireless device 400. The data exchange is on the side of the PC 405 organized according to the Transmission Control Protocol (TCP) by the PC TCP/IP stack 455 which collects data to be sent from the application programs 450 and distributes received data to them.

Downlink (DL) data coming from the internet 415 (also referred to as download data) arrive via the connection over the air 430 at the wireless device (modem) 400 and are processed in the protocol stack 460. The protocol stack 460 is for example a 3G or 4G (UMTS) or UMTS-LTE or UMTS-LTE-Advanced wireless protocol stack. The DL data are sent via the DL outgoing buffer 465 and the local connection 420 to the PC 405. Here the DL data are received at the PC DL buffer 470 and forwarded to the PC TCP/IP stack 455.

Uplink (UL) data coming from the application programs 450 (also referred to as upload data) pass through the PC TCP/IP stack 455 and the PC UL buffer 475. The UL data arrive via the local connection 425 at the wireless device (modem) 400 and are here received by the input port 480. Furthermore the PC TCP/IP stack 455 generates acknowledgements (ACKs) to acknowledge receipt of DL data. These ACKs are sent to the internet 415 in parallel with the UL data. After passing through the PC UL buffer 475 the ACKs arrive via the local connection 425 at the wireless device (modem) 400 and are here received by the input port 480.

According to embodiments of the invention, the UL data and the ACKs are then processed further to achieve data traffic shaping which will be described in the following paragraphs. Only such UL data and ACKs which are forwarded via the data lines 445 are then processed in the protocol stack 460 and sent to the internet 415 via the connection over the air 435.

The UL data packets and the ACKs received by the input port 480 are fed into the UL incoming buffer 485. The size of the UL incoming buffer 485 is primarily determined by performance aspects.

In an embodiment, all the ACKs existing in the UL incoming buffer 485 will be moved to the ACK buffer 490. If no more ACKs fit into the ACK buffer 490, flow control with the PC 405 has to be used. The ACKs in the ACK buffer 490 are then forwarded to the protocol stack 460.

In an embodiment, the UL data packets in the UL incoming buffer 485 will be handled in the following way: The congestion buffer 495 will receive data packets for the UL direction from the UL incoming buffer 485. If a TCP data packet from the UL incoming buffer 485 does not fit anymore into a part of the congestion buffer 495 which is defined by a threshold filling level and which is to be filled first, this data packet will be discarded. Later TCP data packets from the UL incoming buffer 485 will not be discarded. The control unit 500 controls which TCP data packets are discarded. Discarding a TCP data packet is symbolized in FIG. 4 by the broken arrow 505 pointing away from the control unit 500. Also non-TCP data packets, e.g. UDP data packets, will not be discarded. If data packets not to be discarded do not fit into the congestion buffer 495 at all, i.e. also the part above the threshold filling level is full, then flow control with the PC 405 may be used. Alternatively another buffer may be used to accommodate the data packets which are not to be discarded.

The multiplexer (MUX) 510 will multiplex the ACKs from the ACK buffer 490 and the UL data packets from the congestion buffer 495 and send them to the protocol stack 460.

In an embodiment, the ACKs will always have a higher priority then the UL data packets. This means, UL data packets will be sent to the protocol stack 460 only when the ACK buffer 490 is empty.

As the protocol stack 460 usually contains also buffers, it is useful either to keep these buffers as small as possible or to send the ACKs and UL data packets to the protocol stack 460 only when the buffers in the protocol stack 460 risk getting empty. Else, these buffers might get filled up with UL data and the ACKs might have to wait potentially too long time. This could then disturb the TCP flow and delay the DL data.

The size of the congestion buffer 495 may be chosen in such a way that even after a packet loss, e.g. when a TCP UL data packet is discarded or gets lost on its further way to the server 410, the congestion buffer 495 will not run empty. The appropriate size depends primarily on the product "BW times RTT", where BW is a maximum transmission bandwidth for a forwarding of an UL data packet and where RTT is a minimum round trip time for a transmission and an acknowledgement of an UL data packet. RTT may be measured with the empty congestion buffer 495 and the fully utilized DL data connection.

If the size, more precisely the maximum used filling level, of the congestion buffer 495 is at least slightly larger than the product "BW times RTT", the TCP congestion window used by the PC TCP/IP stack 455 for UL data may expand to a maximum value of at least slightly larger than 2 times BW times RTT until a further UL data packet "on the fly" does not fit anymore into the congestion buffer 495 and will be discarded. Because the TCP congestion window used by the PC TCP/IP Stack 455 will be halved when a packet loss is detected by the PC TCP/IP Stack 455, the new TCP congestion window will still be at least slightly larger than the product "BW times RTT". The congestion buffer 495 will therefore not run completely empty and this will help exploiting the full available BW in UL. On the other hand, the congestion buffer 495 should be kept relatively small in order to reduce the data packet travel time from client to server.

In an embodiment, the size of the congestion buffer 495 is larger than BW times RTT and is less than 2 times BW times RTT. For example, if BW=40 kB/s and RTT=1 s, the congestion buffer 495 may be dimensioned to hold a data amount of between 40 kB and 80 kB.

In another embodiment, the size of the congestion buffer 495 is larger than BW times RTT and is less than 3 times BW times RTT. For example, if BW=40 kB/s and RTT=1 s, the congestion buffer 495 may be dimensioned to hold a data amount of between 40 kB and 120 kB.

In an embodiment, the size, more precisely a maximum used filling level or a threshold filling level, of the congestion buffer 495 is dynamically adjusted during an ongoing data transfer. The used size is adjusted to be as low as possible without the buffer running empty. If more than a few, e.g. more than two or three, data packets always remain in the buffer even after an event, where the TCP congestion window used by the PC TCP/IP stack 455 is reduced, then the used size (the threshold) is lowered. If less than a few, e.g. less than two or three, data packets remain in the buffer after an event, where the TCP congestion window used by the PC TCP/IP stack 455 is reduced, or the buffer even runs empty in such case, then the used size (the threshold) is raised.

According to embodiments of the invention, the congestion buffer 495 and/or the ACK buffer 490 may each be realized by a separate physical buffer memory, by a part of a physical buffer memory, by a logical buffer memory, by assigning an attribute "stored in the congestion buffer" or "stored in the ACK buffer" to data stored in any memory or by any combination thereof.

In an embodiment, the congestion buffer 495 and the ACK buffer 490 are combined into one unified buffer. A part of this unified buffer which will be used for both UL data packets and ACKs in the order as they arrive is defined by a trigger filling level of the unified buffer. Once this trigger filling level is reached, no more TCP data packets are fed into the unified buffer. From now on all newly arriving TCP data packets are discarded or deleted until the actual filling level falls below the trigger filling level. In contrast, ACKs are still allowed to be entered into the unified buffer even if the actual filling level is above the trigger filling level.

In an embodiment, the ACK buffer 490 and/or the congestion buffer 495 are not implemented as separate buffers. Instead of this, the UL incoming buffer 485 is configured to carry out their respective functions as described in this application. So all the ACKs and UL data packets need not be moved from the UL incoming buffer 485 to other buffers. They are just read and processed, i.e. are marked as an ACK or as an UL data packet and given a priority for forwarding, or, in the case of UL data packets, are deleted (instead of discarded) if a predetermined maximum amount of UL data in the UL incoming buffer 485 is exceeded.

According to an embodiment of the invention, a method of data shaping or an apparatus described in this application is used in the downlink direction of a data connection.

According to an embodiment of the invention, a method of data shaping or an apparatus described in this application is used in the high speed direction of an asymmetrical data connection.

According to an embodiment of the invention, a method of data shaping or an apparatus described in this application is used in both the low speed direction and the high speed direction of an asymmetrical data connection.

According to an embodiment of the invention, a method of data shaping or an apparatus described in this application is used in a symmetrical data connection.

According to an embodiment of the invention, a method of data shaping or an apparatus described in this application is used in both directions of a symmetrical data connection.

According to an embodiment of the invention, any embodiment defined by one of the claims may be combined with any one or more other embodiments defined by respective one or more of the other claims.

The invention claimed is:

1. A method of data traffic shaping, comprising:
    receiving data packets, the data packets to be forwarded in a first direction of a bidirectional data connection;
    storing at least one of the data packets in a buffer memory if the buffer memory has an available space for accommodating the at least one of the data packets;
    discarding at least one other of the data packets if the buffer memory does not have an available space for accommodating the at least one other of the data packets;
    signaling to the sender of the data packets that a bandwidth in a second direction of the bidirectional data connection is too high; and
    lowering the bandwidth in the second direction by the sender;
    wherein the bandwidth in the second direction is a maximum transmission bandwidth.

2. The method as recited in claim 1, further comprising:
    forwarding the stored at least one of the data packets.

3. The method as recited in claim 1, further comprising:
    not forwarding the discarded at least one other of the data packets.

4. The method as recited in claim 1, wherein the discarding comprises discarding only one other of the data packets.

5. The method as recited in claim 1, wherein the data packets are payload data packets.

6. The method as recited in claim 1, wherein the data packets are Transmission Control Protocol (TCP) data packets.

7. The method as recited in claim 1, wherein the receiving comprises receiving the data packets in a multiplexed data stream together with acknowledgements, the acknowledgements to be forwarded.

8. The method as recited in claim 7, further comprising:
    filtering out the acknowledgements from the multiplexed data stream.

9. The method as recited in claim 7, further comprising:
    forwarding one or more of the acknowledgements, the one or more of the acknowledgements received later than the stored at least one of the data packets and having a higher priority than the stored at least one of the data packets.

10. The method as recited in claim 7, further comprising:
    storing the acknowledgements in an acknowledgement buffer.

11. The method as recited in claim 10, further comprising:
    forwarding all of the stored acknowledgements with a higher priority than the stored at least one of the data packets.

12. The method as recited in claim 1, wherein the buffer memory has a total assigned space for accommodating the at least one of the data packets, the total assigned space being larger than the bandwidth times a round trip time and being less than 2 times the bandwidth times the round trip time, wherein the round trip time is a minimum round trip time for a transmission and an acknowledgement of the at least one of the data packets.

13. The method as recited in claim 1, wherein the buffer memory has a total assigned space for accommodating the at least one of the data packets, the total assigned space being dynamically adjusted during an ongoing data transfer.

14. A method of data traffic shaping, comprising:
    receiving payload data packets, the payload data packets to be forwarded in a first direction of a bidirectional data connection;
    storing the received payload data packets in a buffer memory if the buffer memory has an assigned free space available for the respective next received payload data packet;
    discarding the received payload data packets, if the buffer memory does not have an assigned free space available for the respective next received payload data packet;
    signaling to the sender of the data packets that a bandwidth in a second direction of the bidirectional data connection is too high; and
    lowering the bandwidth in the second direction by the sender;
    wherein the bandwidth in the second direction is a maximum transmission bandwidth.

15. The method as recited in claim 14, further comprising:
    receiving acknowledgements for data transmitted in the second direction of the bidirectional data connection, the acknowledgements to be forwarded in the first direction of the bidirectional data connection.

16. The method as recited in claim 15, further comprising:
    forwarding the stored payload data packets; and
    forwarding the received acknowledgements with a higher priority than the stored payload data packets.

17. An apparatus, comprising:
    an input port to receive data packets, the data packets to be forwarded in a first direction of a bidirectional data connection;
    a buffer memory to store at least one of the data packets if the buffer memory has an available space for accommodating the at least one of the data packets; and
    a control unit to discard at least one other of the data packets if the buffer memory does not have an available space for accommodating the at least one other of the data packets;
    wherein the sender of the data packets is signaled that a bandwidth in a second direction of the bidirectional data connection is too high; and
    the bandwidth in the second direction is lowered by the sender;
    and wherein the bandwidth in the second direction is a maximum transmission bandwidth.

18. The apparatus as recited in claim 17, wherein the discarding comprises discarding only one other of the data packets.

19. The apparatus as recited in claim 17, wherein the buffer memory has a total assigned space for accommodating the at least one of the data packets, the total assigned space being larger than the bandwidth times a round trip time and being less than 2 times the bandwidth times the round trip time, wherein the round trip time is a minimum round trip time for a transmission and an acknowledgement of the at least one of the data packets.

20. The apparatus as recited in claim 17, wherein the buffer memory has a total assigned space for accommodating the at least one of the data packets, the total assigned space being dynamically adjusted during an ongoing data transfer.

21. The apparatus as recited in claim 17, the input port further to receive acknowledgements, the acknowledgements to be forwarded.

22. The apparatus as recited in claim 21, further comprising:
- a forwarding unit to forward the stored at least one of the data packets and to forward an acknowledgement, the acknowledgement received later than the stored at least one of the data packets, with a higher priority than the stored at least one of the data packets.

23. A wireless device comprising:
- an input port to receive data packets, the data packets to be forwarded in a first direction of a bidirectional data connection;
- a buffer memory to store at least one of the data packets if the buffer memory has an available space for accommodating the at least one of the data packets; and
- a control unit to discard at least one other of the data packets if the buffer memory does not have an available space for accommodating the at least one other of the data packets;

wherein the sender of the data packets is signaled that a bandwidth in a second direction of the bidirectional data connection is too high; and the bandwidth in the second direction is lowered by the sender;

and wherein the bandwidth in the second direction is a maximum transmission bandwidth.

* * * * *